(12) United States Patent
Patience

(10) Patent No.: US 11,407,497 B2
(45) Date of Patent: Aug. 9, 2022

(54) CAVITY ACOUSTIC TONES SUPPRESSION

(71) Applicant: BAE Systems plc, London (GB)

(72) Inventor: David Euan Patience, Frimley (GB)

(73) Assignee: BAE Systems plc, London (GB)

( * ) Notice: Subject to any disclaimer, the term of this patent is extended or adjusted under 35 U.S.C. 154(b) by 803 days.

(21) Appl. No.: 16/337,949

(22) PCT Filed: Oct. 2, 2017

(86) PCT No.: PCT/GB2017/052951
§ 371 (c)(1),
(2) Date: Mar. 29, 2019

(87) PCT Pub. No.: WO2018/069671
PCT Pub. Date: Apr. 19, 2018

(65) Prior Publication Data
US 2020/0062379 A1 Feb. 27, 2020

(30) Foreign Application Priority Data

Oct. 11, 2016 (EP) ..................................... 16193219
Oct. 11, 2016 (GB) ...................................... 1617217

(51) Int. Cl.
*B64C 21/02* (2006.01)
*B64D 1/06* (2006.01)
(Continued)

(52) U.S. Cl.
CPC ............ *B64C 21/02* (2013.01); *B64C 23/005* (2013.01); *B64D 1/06* (2013.01); *G10K 11/20* (2013.01);
(Continued)

(58) Field of Classification Search
CPC .............. B64C 23/005; B64C 2230/14; B64C 2230/00; B64C 2230/08; B64C 2230/24;
(Continued)

(56) References Cited

U.S. PATENT DOCUMENTS 2,791,387 A * 5/1957 Weinberg ................. B64D 1/04
89/1.51
3,934,846 A * 1/1976 Maurer .................... B64D 1/04
244/130
(Continued)

FOREIGN PATENT DOCUMENTS

CN 105751869 A 7/2016
EP 2778045 A1 9/2014
(Continued)

OTHER PUBLICATIONS

European Search Report fpr Appl No. 16193219.9 dated Mar. 15, 2017, 9 pages.
(Continued)

*Primary Examiner* — Assres H Woldemaryam
*Assistant Examiner* — Shanna Danielle Glover
(74) *Attorney, Agent, or Firm* — Maine Cernota & Rardin

(57) ABSTRACT

A cavity system, comprising: a cavity (2) comprising a cavity opening; and an acoustically reflective structure (18, 20) located at least partially within the cavity (2), the acoustically reflective structure (18, 20) comprising one or more acoustically reflective surfaces (24, 26, 30, 32), each acoustically reflective surface (24, 26, 30, 32) being oblique to a plane of the cavity opening (27). The one or more acoustically reflective surfaces (24, 26, 30, 32) may be arranged to reflect incident acoustic waves out of the cavity opening while avoiding reflection into a region (48) at or proximate to a leading edge (14) of the cavity (2).

12 Claims, 4 Drawing Sheets

(51) Int. Cl.
   *G10K 11/20* (2006.01)
   *B64C 23/00* (2006.01)
   *F15D 1/10* (2006.01)

(52) U.S. Cl.
   CPC ...... *B64C 2230/08* (2013.01); *B64C 2230/14* (2013.01); *F15D 1/10* (2013.01)

(58) Field of Classification Search
   CPC ........... B64C 23/06; B64C 21/02; F15D 1/10; G10K 11/20
   See application file for complete search history.

(56) References Cited

U.S. PATENT DOCUMENTS

| | | | |
|---|---|---|---|
| 4,215,761 A | | 8/1980 | Andrews |
| 4,703,904 A | * | 11/1987 | Haslund ................... G02B 5/00 244/1 R |
| 5,340,054 A | | 8/1994 | Smith |
| 5,699,981 A | | 12/1997 | McGrath |
| 6,098,925 A | | 8/2000 | Burdsall, II |
| 6,296,202 B1 | | 10/2001 | Stanek |
| 6,739,554 B1 | | 5/2004 | Stanek |

FOREIGN PATENT DOCUMENTS

| | | | | |
|---|---|---|---|---|
| FR | 3010971 A1 | | 3/2015 | |
| GB | 2514452 A | * | 11/2014 | ........... B64C 23/005 |

OTHER PUBLICATIONS

Great Britain Search Report for Appl No. GB1617217.3 dated Apr. 10, 2017, 4 pages.
PCT Search Report for Appl No. PCT/GB2017/052951 dated Dec. 5, 2017, 3 pages.
United States Statutory Invention Registration H501, Rubin et al, Aug. 2, 1998, 4 pages.
European Written Opinion for Appl No. 16193219.9 dated Mar. 15, 2017, 5 pages.
International Preliminary Report on Patentability for Appl No. PCT/GB2017/052951 dated Apr. 16, 2019, 8 pages.

* cited by examiner

CAVITY ACOUSTIC TONES SUPPRESSION

RELATED APPLICATIONS

This application is a national phase application filed under 35 USC § 371 of PCT Application No. PCT/GB2017/052951 with an International filing date of 2 Oct. 2017 which claims priority of GB Patent Application 1617217.3 filed 11 Oct. 2016 and EP Patent Application 16193219.9 filed 11 Oct. 2016. Each of these applications is herein incorporated by reference in their entirety for all purposes.

FIELD OF THE INVENTION

The present invention relates to methods and systems for suppression of acoustic tones and/or resonance and/or other acoustic tone effects in cavities for when they are moving relative to an ambient fluid. The present invention relates in particular to, but is not limited to, such methods and systems for cavities recessed in a surface, for example in a surface of a vehicle, for example aircraft cavities, for example bays, when the aircraft is travelling through air.

BACKGROUND

Considering the case of a surface with a cavity recessed in the surface, when the surface, and hence the recessed cavity, is moving in ambient fluid, for example when an aircraft with an open bay, for example an open weapons bay or an open undercarriage bay, is moving in air, a shear layer is formed between (i) the moving ambient air that is flowing across the surface and across the top of the recessed cavity, and (ii) the static air in the cavity (from the reference point of the aircraft). A vortex is shed from the cavity leading edge and grows as it travels down the shear layer and impacts on the aft (trailing) wall of the bay resulting in the emission of noise. Also the acoustic wave resulting from the emission of noise travels back upstream inside the bay. The fluctuating pressure of the acoustic wave may either result in vortices being shed from the leading edge cavity lip or formed in the region close to the leading edge lip such that a series of vortices is formed down the shear layer at a preferential rate which is related to the frequency of the upstream acoustic wave. The vortices grow into large scale structures as they propagate downstream in the shear layer and then impact the aft (trailing) wall of the bay at a characteristic rate. This results in acoustic noise being generated at a characteristic rate which may be described as acoustic tones of a characteristic frequency.

The frequency of the tones may be formulated using Rossiter's equation. It can be seen that there is a feedback loop formed by the passage of the vortices and the upstream propagating acoustic wave.

U.S. Pat. No. 5,340,054 discloses an airframe cavity oscillations suppression arrangement in which plural pins are positioned upstream of the leading edge of the cavity (i.e. outside the cavity). Other examples of cavity resonance/oscillations suppression arrangements comprising added fixed structures (all of which are placed outside the cavity, either upstream of the leading edge or downstream of the aft (trailing) edge) include ones disclosed in U.S. Pat. Nos. 5,699,981; 6,098,925; 6,739,554; and 3,934,846. U.S. Pat. No. 6,296,202 discloses an arrangement comprising an oscillating spoiler plate.

More generally, air intakes or other tunnel like arrangements are known. Such arrangements, even if considered as including a cavity as such, do not include cavities that are of the type being addressed in the present invention, which on the contrary include cavities recessed in a surface.

SUMMARY OF THE INVENTION

The present inventor has realised that it would be desirable to provide a form of cavity tone suppression and/or control by reflecting as much acoustic energy out of the cavity as possible in order to minimise the acoustic energy propagated forward to interact with shear layer close to the leading edge. The present inventor has further realised that one way, for example, to control or suppress the cavity tones comprises the use of angled surfaces within the cavity to reflect noise generated within the cavity.

In a first aspect, the present invention provides a cavity system, comprising: a cavity comprising a cavity opening; and an acoustically reflective structure located at least partially within the cavity, the acoustically reflective structure comprising one or more acoustically reflective surfaces, each acoustically reflective surface being oblique to a plane of the cavity opening.

The one or more acoustically reflective surfaces may be arranged to reflect an incident acoustic wave out of the cavity opening while avoiding reflection of the incident acoustic wave into a region at or proximate to a leading edge of the cavity. The leading edge may be relative to an actual or intended flow direction of a fluid over the cavity. The region at or proximate to a leading edge of the cavity may extend from the leading edge towards a trailing edge of the cavity by a distance of 0.2 multiplied by a distance between the leading edge and the trailing edge of the cavity. The trailing edge may be relative to the actual or intended flow direction of a fluid over the cavity.

The acoustically reflective structure may comprise a structure mounted to or formed from a trailing edge wall of the cavity, such that one or more of the acoustically reflective surfaces are located at or mounted to the trailing edge wall of the cavity. The one or more acoustically reflective surfaces located at or mounted to the trailing edge wall of the cavity may be inclined with respect to a longitudinal dimension of the cavity between the leading and trailing edges of the cavity. The acoustically reflective structure may comprise a structure mounted to or formed from a leading edge wall of the cavity, such that one or more of the acoustically reflective surfaces are located at or mounted to the leading edge wall of the cavity. The one or more acoustically reflective surfaces located at or mounted to the leading edge wall of the cavity may be declined with respect to a longitudinal dimension of the cavity between the leading and trailing edges of the cavity.

The acoustically reflective structure may be integral with one or more walls of the cavity. The acoustically reflective structure may have a substantially saw-tooth shaped cross-section. The acoustically reflective structure may be wholly located with the cavity.

The one or more acoustically reflective surfaces may comprise one or more surfaces selected from the group of surfaces consisting of: flat, planar surfaces; curved surfaces; and multi-faceted surfaces.

The acoustically reflective structure may comprise a baffle disposed within the cavity between a leading edge wall of the cavity and a trailing edge wall of the cavity. The baffle may be arranged across at least part of a width of the cavity. Preferably, the baffle is arranged across the entirety of the width of the cavity.

The cavity may be a cavity recessed in a surface. The surface may be a surface comprised by a vehicle. The vehicle may be an aircraft, or a missile, or any other type of vehicle, for example a car or a lorry, or a sea vessel, including for example a submarine.

In a further aspect, the present invention provides a method of controlling acoustic tones in a cavity, the cavity comprising a cavity opening. The method comprises locating at least part of an acoustically reflective structure within the cavity, the acoustically reflective structure comprising one or more acoustically reflective surfaces, wherein the acoustically reflective structure is arranged such that each acoustically reflective surface is oblique to a plane of the cavity opening.

DETAILED DESCRIPTION

It will be appreciated that relative terms such as horizontal and vertical, top and bottom, above and below, front and back, and so on, are used above merely for ease of reference to the Figures, and these terms are not limiting as such, and any two differing directions or positions and so on may be implemented rather than truly horizontal and vertical, top and bottom, and so on. In particular, for convenience, in the Figures a cavity is shown with it opening at the top of the page, and so for convenience the word "top" is used to mean the opening of the cavity, and the word "above" means further away from the cavity, However, it will be appreciated that the present invention refer also to cavities positioned for example underneath the wing or fuselage of e.g. an aircraft, i.e. upside down to that shown in the Figures, but the description use of the word "top" will still refer to the opening part of the cavity and that of the word "above" will still refer to being away from the cavity.

Figure 1:
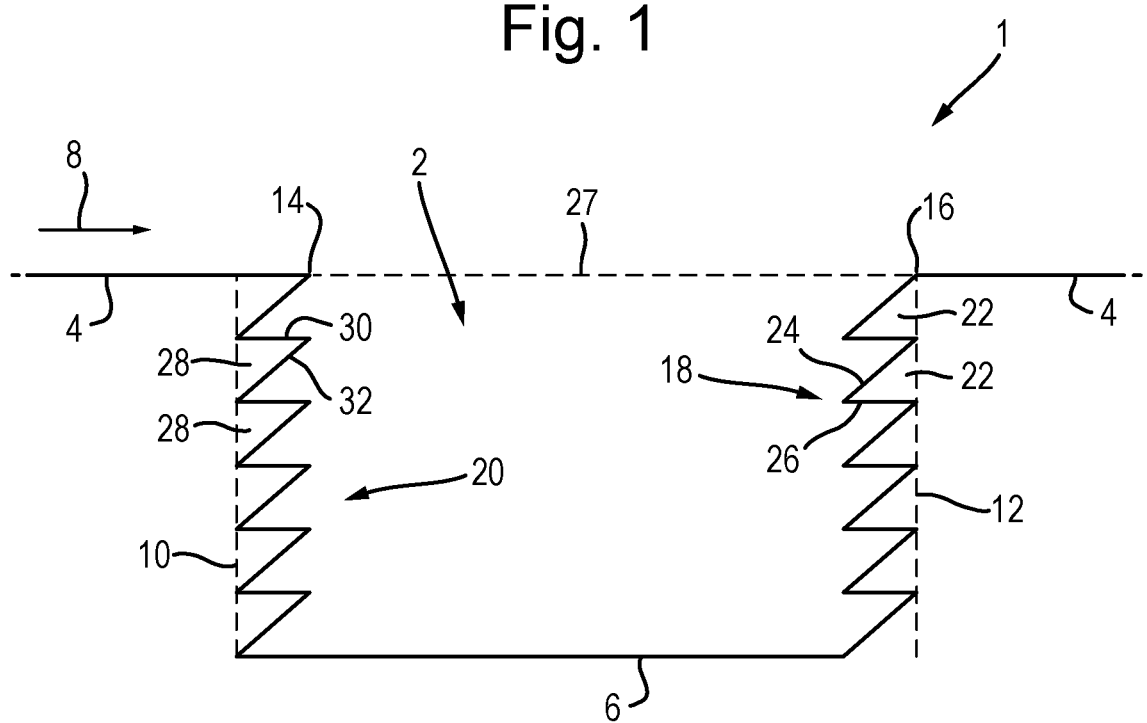
FIG. 1 is a schematic illustration (not to scale) of a side view cross section of a cavity acoustic tones control system.

FIG. 1 is a schematic illustration (not to scale) of a side view cross section of a first embodiment of a cavity acoustic tones control system 1. The cavity acoustic tone control system 1 comprises a cavity 2 recessed in a surface 4 of an aircraft. The cavity 2 is a bay of the aircraft, for example a weapons bay. The surface 4 is substantially planar, although not necessarily flat and not necessarily without non-uniformities or items fixed thereto.

In this embodiment, the cavity 2 is substantially rectangular and comprises a substantially planar base 6. The cavity 2 further comprises, defined relative to an actual or intended flow direction 8 (the flow direction 8 being across, or over, the surface 4 and the cavity 2), a leading wall 10, an aft (trailing) wall 12, and two opposing side walls (not shown in FIG. 1, as FIG. 1 is a cross section taken through a plane parallel to the side walls) disposed between the leading wall 10 and the aft wall 12. In this embodiment these walls are all perpendicular to the planar base 6. At the top of the cavity 2, the cavity 2 comprises, for each of these walls respectively, a leading edge 14, an aft (trailing) edge 16, and two side edges (not shown).

As can be appreciated from FIG. 1, a gap or major change in orientations in the surface 4 in effect provides the opening of the cavity 2, and the cavity 2 is in the form of a recess in the surface 4. It is noted that the terminology "cavity recessed in a surface" as used herein includes cases where the overall effect or geometry of the cavity 2 is that it will be recognised as a "cavity recessed in a surface", even if strictly speaking the surface 4 and/or one or more of the walls 10, 12 and/or the planar base 6 are not made from a single continuous piece or type of material.

In this embodiment, the cavity acoustic tones control system 1 further comprises a first acoustically reflective surface 18 and a second acoustically reflective surface 20.

The first acoustically reflective surface 18 is integrally formed with the structure of the aft wall 12. In this embodiment, the first acoustically reflective surface 18 covers substantially the entirety of the aft wall 12.

The first acoustically reflective surface 18 comprises a plurality of ridges, hereinafter referred to as the "first ridges", a selection of which are indicated in FIG. 1 by the reference numeral 22. The first ridges 22 extend from the aft wall 12 into the cavity volume. The first ridges 22 are substantially parallel with each other. The first ridges 22 are substantially parallel with the trailing edge 16 of the cavity 2, and are also substantially perpendicular to the flow direction 8, i.e. such that the first ridges 22 are directed in a direction that is perpendicular to the drawing page for FIG. 1. In other words, the first ridges 22 are transverse ridges disposed on the aft wall 12 across substantially an entirety of the width of the cavity 2.

In this embodiment, each of the first ridges 22 comprises a respective pair of upper and lower facetted surfaces, such that the plurality of first ridges 22 of the first acoustically reflective surface 18 forms a saw-tooth shaped cross-section, the section being taken in a plane that is perpendicular to a traverse direction across the width of the cavity 2 (i.e. the section being taken in the plane of the drawing page for FIG. 1). An example upper surface of a first ridge 22 is indicated in FIG. 1 by the reference numeral 24. An example lower surface of a first ridge 22 is indicated in FIG. 1 by the reference numeral 26.

The first ridges 22, formed by pairs of alternating upper 24 and lower 26 facetted surfaces, form an asymmetrical saw-tooth shaped relief structure at the aft wall 12. In particular, in this embodiment, the upper surfaces 24 of the first ridges 22 are oblique (i.e. neither parallel nor perpendicular) to the aft wall 12, while the lower surfaces 26 of the first ridges 22 are substantially perpendicular to the aft wall 12. In this embodiment, the upper surfaces 24 of the first ridges 22 are acoustically reflective surfaces that are oblique to the plane of the cavity opening (which is indicated in FIG. 1 by a dotted line and the reference numeral 27).

In this embodiment, the upper surfaces 24 of the first ridges 22 face upwards, and out of the cavity opening. In particular, normals to the upper surfaces 24 of the first ridges 22 point from the upper surfaces 24 of the first ridges 22 out of the opening of the cavity 2. In other words, the upper surfaces 24 of the first ridges 22 are inclined with respect to a longitudinal dimension of the cavity 2, the longitudinal direction of the cavity 2 being a dimension between the leading wall 10 and aft wall 12.

The second acoustically reflective surface 20 is integrally formed with the structure of the leading wall 10. In this embodiment, the second acoustically reflective surface 20 covers substantially the entirety of the aft wall 12.

The second acoustically reflective surface 20 comprises a plurality of ridges, hereinafter referred to as the "second ridges", a selection of which are indicated in FIG. 1 by the reference numeral 28. The second ridges 28 extend from the leading wall 10 into the cavity volume. The second ridges 28 are substantially parallel with each other. The second ridges 28 are substantially parallel with the leading edge 14 of the cavity 2, and are also substantially perpendicular to the flow direction 8, i.e. such that the second ridges 28 are directed in a direction that is perpendicular to the drawing page for FIG. 1. In other words, the second ridges 28 are transverse ridges disposed on the leading wall 10 across substantially an entirety of the width of the cavity 2.

In this embodiment, each of the second ridges 28 comprises a respective pair of upper and lower facetted surfaces, such that the plurality of second ridges 28 of the second acoustically reflective surface 20 forms a saw-tooth shaped cross-section, the section being taken in a plane that is perpendicular to a traverse direction across the width of the cavity 2 (i.e. the section being taken in the plane of the drawing page for FIG. 1). An example upper surface of a second ridge 28 is indicated in FIG. 1 by the reference numeral 30. An example lower surface of a second ridge 28 is indicated in FIG. 1 by the reference numeral 32.

The second ridges 28, formed by pairs of alternating upper 30 and lower 32 facetted surfaces, form an asymmetrical saw-tooth shaped relief structure at the leading wall 10. In particular, in this embodiment, the upper surfaces 30 of the second ridges 28 are substantially perpendicular to the leading wall 10, while the lower surfaces 32 of the second ridges 28 are oblique to the leading wall 10. In this embodiment, the lower surfaces 32 of the second ridges 28 are acoustically reflective surfaces that are oblique to the plane of cavity opening 27.

In this embodiment, the lower surfaces 32 of the second ridges 28 face downwards, towards the base 6 of the cavity 2. In particular, normals to the lower surfaces 32 of the second ridges 28 point from the lower surfaces 32 of the second ridges 28 to the base 6. In other words, lower surfaces 32 of the second ridges 28 are declined with respect to the longitudinal dimension of the cavity 2.

Figure 2:
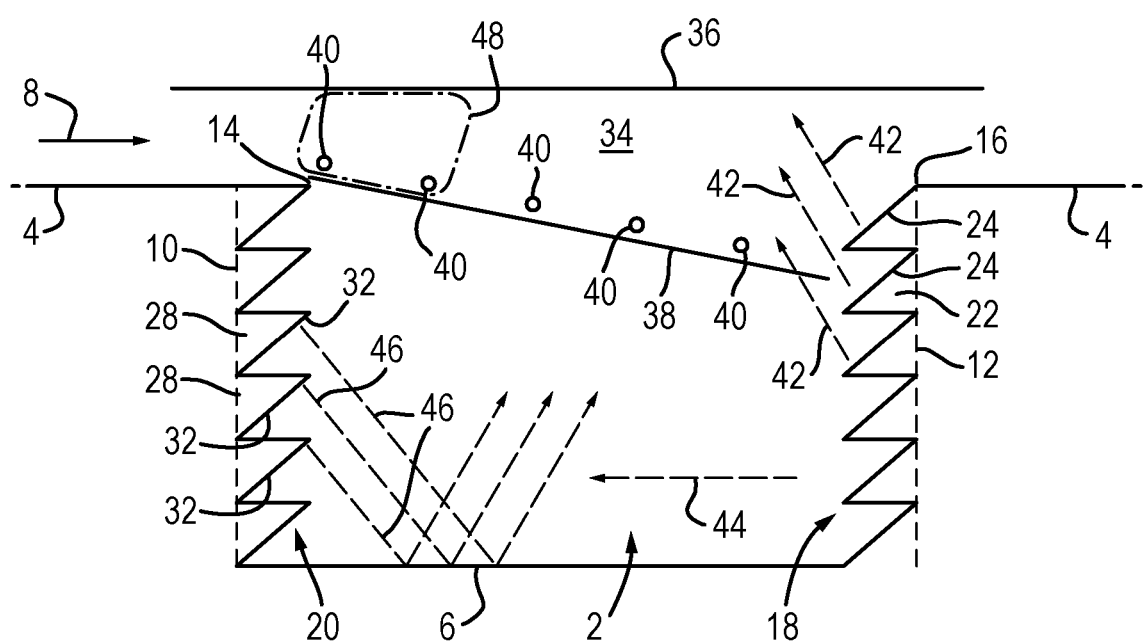
FIG. 2 is a further schematic illustration (not to scale) of a side view cross section of the cavity acoustic tones control system

The tendency of the cavity acoustic tones control system 1 to control acoustic tones when in operation will now be described with reference to FIG. 2. Like FIG. 1, FIG. 2 is a schematic cross-sectional view (not to scale) of the cavity acoustic tones control system 1. In FIGS. 1 and 2, like reference numerals indicate like elements. Certain features and reference numerals shown in FIG. 1 are omitted from FIG. 2 for reasons of clarity and ease of depiction.

In operation, a shear layer 34 is formed between the moving ambient air that is flows across the surface 4 and across the opening of the recessed cavity 2, and the static air in the cavity 2. The shear layer 34 is represented schematically in FIG. 2 as the region between a line representing the top 36 (i.e. furthest away from the cavity 2) of the shear layer 34 and a line representing the bottom 38 (i.e. closest to the cavity 2) of the shear layer 34.

Also in operation, vortices 40 are shed from the cavity leading edge 14 and tend to grow as they travels down the shear layer 34 to impact with the first acoustically reflective surface 18 at the aft (trailing) wall 12 of the bay. This impingement of the vortices 40 on the aft wall 12 results in the emission of noise. At least some of the radiated noise caused by the vortices 40 colliding with the aft wall 12/first acoustically reflective surface 18 tends to be reflected out of the cavity 2 by the first acoustically reflective surface 18. In particular, due the orientations of the upper surfaces 24 of the first ridges 22, acoustic energy tends to be reflected from the upper surfaces 24 of the first ridges 22 out of the cavity opening, as indicated in FIG. 2 by dotted arrows and the reference numerals 42.

While much of the noise generated by the vortices 40 impacting the aft wall 12 is reflected out of the cavity 2, nevertheless, an acoustic wave may travel back upstream inside the cavity volume (as indicated in FIG. 2 by dotted arrows and the reference numeral 44). This reflected acoustic wave 44 impacts with the second acoustically reflective surface 20 at the leading wall 10 of the cavity 2. At least some of the acoustic wave 44 colliding with the leading wall 10/second acoustically reflective surface 20 tends to be reflected out of the cavity 2 by the second acoustically reflective surface 20. In particular, due the orientations of the lower surfaces 32 of the second ridges 28, acoustic energy tends to be reflected from the lower surfaces 32 of the second ridges 28 towards the planar base 6, which in turn reflects that acoustic energy out of the cavity opening, as indicated in FIG. 2 by dotted arrows and the reference numerals 46.

In this embodiment, the shape and/or the orientations (e.g. relative to the walls 10, 12 of the cavity 2) of the acoustically reflecting surfaces of the first and second acoustically reflective surfaces 18, 20 are such that acoustic energy 42, 46 is reflected out of the cavity 2 while avoiding or minimising reflections into a region of the shear layer 34 located adjacent to the cavity leading edge 14. This region is hereinafter referred to as "the leading edge region" and is indicated in FIG. 2 by a dotted boundary and the reference numeral 48. In this embodiment, the leading edge region 48 is a region of the shear layer 34 proximate to the leading edge 14. The leading edge region 48 extends from the leading edge 14 towards the trailing edge 16 by a distance of approximately 0.2 multiplied by the length of the cavity 2 (i.e. about 0.2 of the distance between the leading and trailing edges 14, 16). In other embodiments, the leading edge region 48 extends from the leading edge 14 towards the trailing edge 16 by a different distance, e.g. 0.05, 0.1, 0.15, 0.25, 0.3, 0.35, 0.4, 0.45, or 0.5 multiplied by the length of the cavity 2.

Advantageously, the reflection of acoustic energy by the acoustically reflective surfaces tends to reduce or eliminate the acoustic energy that is propagated forward to interact with the shear layer close to the leading edge. Thus, the interaction of acoustic waves with the shear layer close to the leading edge tends to be reduced, thereby disrupting the Rossiter mechanism feedback loop and the formation of further vortices. Thus, the use of the acoustically reflective surfaces tends to reduce the generation of acoustic noise at a characteristic rate, i.e. acoustic tones of a characteristic frequency. This tends to reduce or prevent damage to the aircraft bay structure and/or entities therein caused by high levels of acoustic noise.

The acoustically reflective surfaces disposed at the front and rear walls of the bay each comprise multiple ridges, which are small elements relative to the size of the cavity. This advantageously facilitates retention of the "rectangular box" cross section of the cavity.

Advantageously, the above described acoustic tone control system avoids a need for parts to be deployed into the shear layer.

Advantageously, the above described acoustic tone control system is a passive system that uses no power, for example, no power is drawn from the parent vehicle. Furthermore, the acoustic tone control system does not include moving parts which could fail and constitute a safety risk. Nevertheless, in some embodiments, the acoustic tone control system is an active system that may include a power source (e.g. an electrical or hydraulic power source). In an active acoustic tone control system, supplied power, for example from the parent vehicle, may be utilised to, for example, change the orientation of one or more of the acoustically reflective elements.

In the above embodiments, the acoustically reflective elements of the acoustically reflective surfaces (i.e. the surfaces of the ridges) are planar across the width of the cavity. However, in other embodiments, the reflective elements are not planar across the width of the cavity. For example, one or more of the reflective elements may consist of a multiple differently oriented faceted surfaces. This advantageously tends to create a more diffuse acoustic field across the width of the cavity. The creation of a more diffuse field across the width of the cavity can be a beneficial feature in suppression of the Rossiter mechanism and the shear layer/bay acoustic path as it tends to result in a phase difference in the waves close to the leading edge of the cavity. Also for example, in some embodiments, one or more of the reflective elements is a curved surface. For example, a reflective element may comprise a surface that is curved across the width of the cavity and/or in profile on the reflective element surface. This advantageously tends to create a more diffuse acoustic field across the width of the cavity. In some embodiments, the reflective surfaces are shaped using either curved or faceted elements so as to achieve multiple acoustic reflections from the base, the roof, and/or walls of the cavity before the acoustic wave exits the cavity.

In the above embodiments, each of the ridges of each of the acoustically reflective surfaces comprises one surface perpendicular to the leading/aft walls of the cavity (i.e. parallel to the cavity base), and one surface oblique to the leading/aft walls of the cavity. However, in other embodiments, one or more of the surfaces of one or more of the ridges is different to that of the above embodiments.

Figure 3:
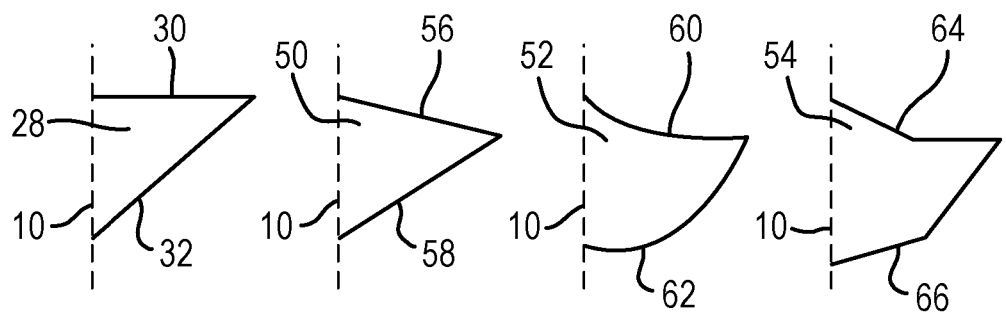
FIG. 3 is a schematic illustration (not to scale) showing cross sections of various example alternative acoustically reflective elements.

FIG. 3 is a schematic illustration (not to scale) showing cross sections of various example alternatives to the above described second ridges 28, which may be included in the second acoustically reflective surface 20. The first acoustically reflective surface 18 may include similarly shaped ridges but with the upper and lower surfaces inverted as detailed by surfaces 24 and 26 in FIG. 1. Combinations of differently shaped ridges may be used to form an acoustically reflective surface. FIG. 3 shows a cross section of a first alternative ridge 50, a second alternative ridge 52, and a third alternative ridge 54. FIG. 3 also shows, for comparison, a second ridge 28 which is described in more detail earlier above with reference to FIGS. 1 and 2. The first alternative ridge 50 comprises an upper surface 56 and a lower surface 58 that are both substantially flat, planar surfaces, and that are both oblique to the leading wall 10 such that, in cross-section as in FIG. 3, the first alternative ridge 50 tapers inwards from the leading wall 10 to nothing at its distal end. Use of the first alternative ridge 50 on the leading wall 10 advantageously tends to minimise multiple reflections into the leading edge region 48. The second alternative ridge 52 comprises an upper surface 60 and a lower surface 62 that are both curved surfaces and are arranged such that, in cross-section as in FIG. 3, the second alternative ridge 52 tapers inwards from the leading wall 10 to nothing at its distal end. In the second alternative ridge 52, the curved surfaces 60, 62 are concave surfaces; however in other embodiments one or both of the surfaces 60, 62 may be convex. The third alternative ridge 54 comprises an upper surface 64 and a lower surface 66 that are both multi-faceted surfaces and are arranged such that, in cross-section as in FIG. 3, the third alternative ridge 54 tapers inwards from the leading wall 10 to nothing at its distal end. In the third alternative ridge 54, the multi-faceted surfaces 64, 66 are concave surfaces, however in other embodiments one or both of the surfaces 64, 66 may be convex. In some embodiments, the profile of one or more of the ridges varies across the width of the cavity 2, i.e. a ridge may comprise multiple different profiles across the cavity width.

In some embodiments, the angles and orientations of the reflective surfaces of the ridges are determined dependent on cavity parameters. For example, these angles and orientations may be dependent upon one or more parameters selected from the group consisting of a length of the cavity, a depth of the cavity, a width of the cavity. The angles of the reflective surfaces of the ridges may be defined by being compatible with avoiding reflections into the leading edge region 48.

In the above embodiments, the first second acoustically reflective surfaces are integral with the aft and leading walls of the cavity respectively. The sizes and shapes of the reflective surfaces, and the shaping of the cavity walls may be determined during the initial design of the cavity. This advantageously tends to improve acoustic performance of the cavity. However, in other embodiments, some or all of one or both of the first second acoustically reflective surfaces are not integral with cavity wall. For example, acoustically reflective surfaces may be in the form of a treatment applied to a cavity wall. For example, reflective elements could be designed and installed into an existing cavity system. This could, for example, be either as the addition of shaped plates that can be mounted to the cavity walls or as smaller reflective elements that can the installed on posts or brackets on the cavity walls. Thus, advantageously, an acoustically reflective surface may be retrofitted to an existing aircraft/vehicle, for example where a problem due to excessive noise in the cavity has been found during operation. Advantageously, an acoustically reflective surface can be installed in an existing cavity around existing features/equipment and still achieve a beneficial reduction in noise levels.

Figure 4:
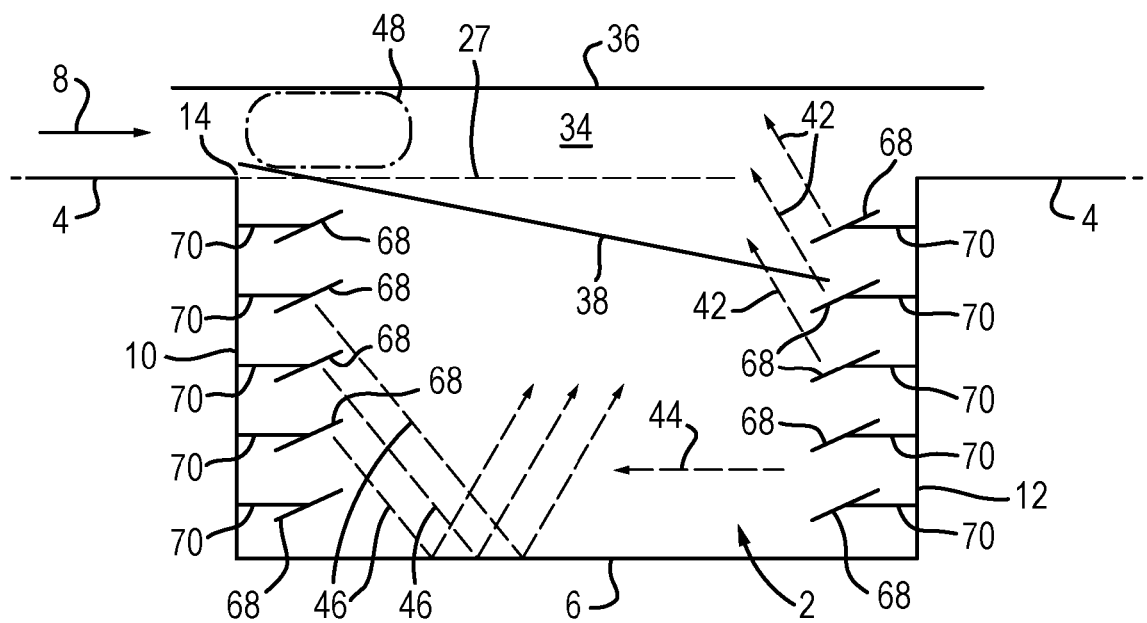
FIG. 4 is a schematic illustration (not to scale) of a side view cross section of a further cavity acoustic tones control system.

FIG. 4 is a schematic illustration (not to scale) of a side view cross section of a further embodiment of a cavity acoustic tones control system. In the Figures, like reference numerals indicate like elements. In this embodiment, a plurality of reflective elements 68 are mounted to the cavity walls 10, 12 via brackets 70. The reflective elements 68 perform substantially the same functions in controlling cavity acoustic tones as the first and second acoustically reflective surfaces 18, 20 described in more detail above with reference to FIGS. 1 and 2.

In the above embodiments, the first and second acoustically reflective surfaces cover substantially the entireties of the aft and leading walls respectively. However, in other embodiments, at least one of the aft and leading walls are not entirely covered by an acoustically reflective surface. The extent of the intrusion of the shear layer into the cavity is dependent on the flow speed. Advantageously, for high speed flows, a good degree of tonal noise suppression tends to be achievable with significantly less than full coverage of the aft and leading edge walls by the acoustically reflective surfaces. To achieve a good degree of noise suppression at high flow speeds, preferably the aft wall comprises acoustically reflective elements to a depth of at least 50% of the total cavity depth from the cavity opening plane. To achieve a good degree of noise suppression at high flow speeds, preferably the leading wall comprises reflective elements to a depth at least of 25% of the total cavity depth from the cavity opening plane. Also, to achieve a good degree of noise suppression at high flow speeds, preferably an acoustically reflective surface covers the aft and/or leading walls to at least 75% of the total cavity width.

In the above embodiments, acoustically reflective surfaces are formed on the aft and leading walls of the cavity. However, in other embodiments, one or more acoustically reflective surfaces are formed on one or more different structures associated with the cavity instead of or in addition to being formed on one or both of the aft and leading walls of the cavity. For example, in some embodiments, an acoustically reflective surface may be formed on part or all of one or more of the side walls of the cavity, or on a cover/door for the cavity.

Also for example, some cavities (such as but not limited to aircraft weapons bays) comprise one or more structural frames and/or may also include equipment housed in the cavity. Typically these frames and equipment comprise surfaces which are aligned predominantly normal to the plane of cavity opening i.e. vertically and along the length of the cavity. As such, conventionally, acoustic waves tend not to be efficiently reflected out of the cavity. In some embodiments, acoustically reflective surfaces oblique to the plane of cavity opening and/or the walls of the cavity are fixed to one or more of the cavity structural frames and/or equipment housed in the cavity. This advantageously tends to result in improved reduction in the tonal noise in the cavity. The orientations of the acoustically reflective surfaces that are fixed to the cavity structural frames or equipment may be designed such that reflection of acoustic energy out of the cavity is provided, while at the same time avoiding reflections into the leading edge region 48. This tends to reduce acoustic energy close to the leading edge region 48, which tends to result in a reduction of tonal noise levels in the cavity.

In some embodiments, equipment housed in the cavity may include a baffle. Surfaces of the baffle may be orientated oblique to the plane of the cavity opening such that reflection of acoustic energy into the leading edge region is reduced or eliminated.

FIGS. 5 to 8 are schematic illustrations (not to scale) showing side view cross sections of further embodiments of a cavity acoustic tones control system, each of which includes a baffle housed in the cavity 2. In the Figures, like reference numerals indicate like elements.

Figure 5:
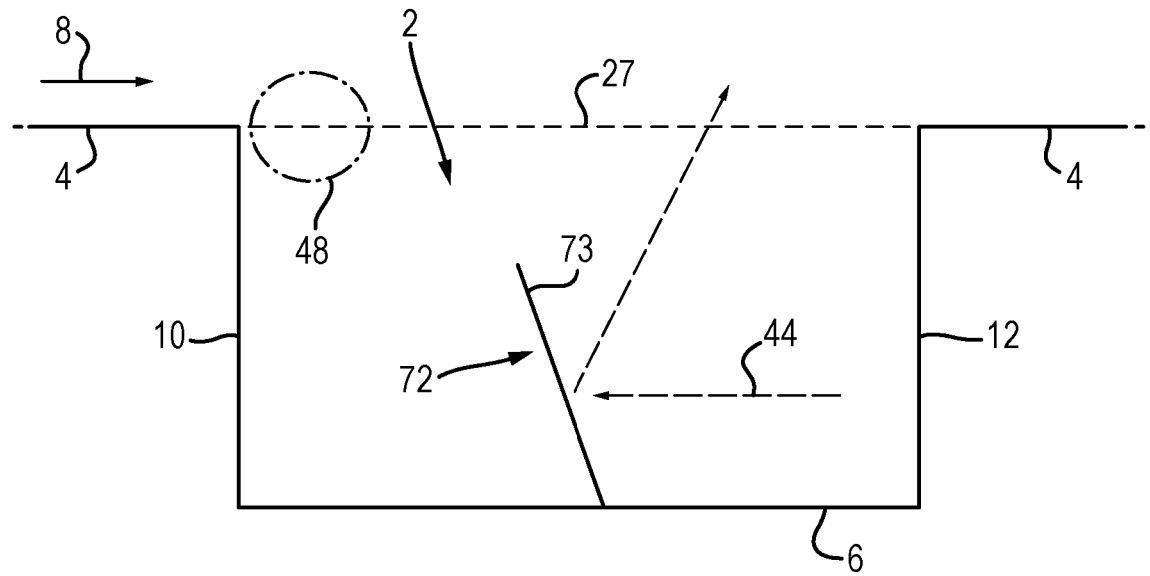
FIG. 5 is a schematic illustration (not to scale) of a side view cross section of a cavity comprising a first acoustic reflective baffle.

In the embodiment shown in FIG. 5, a first baffle 72 comprises a surface 73 arranged to reflect the forward propagating acoustic wave 44 reflected from the aft wall 12 directly out of the opening of the cavity 2 avoiding the leading edge region 48. The surface 73 of the first baffle 72 is oblique to the plane of the cavity opening 27.

Figure 6:
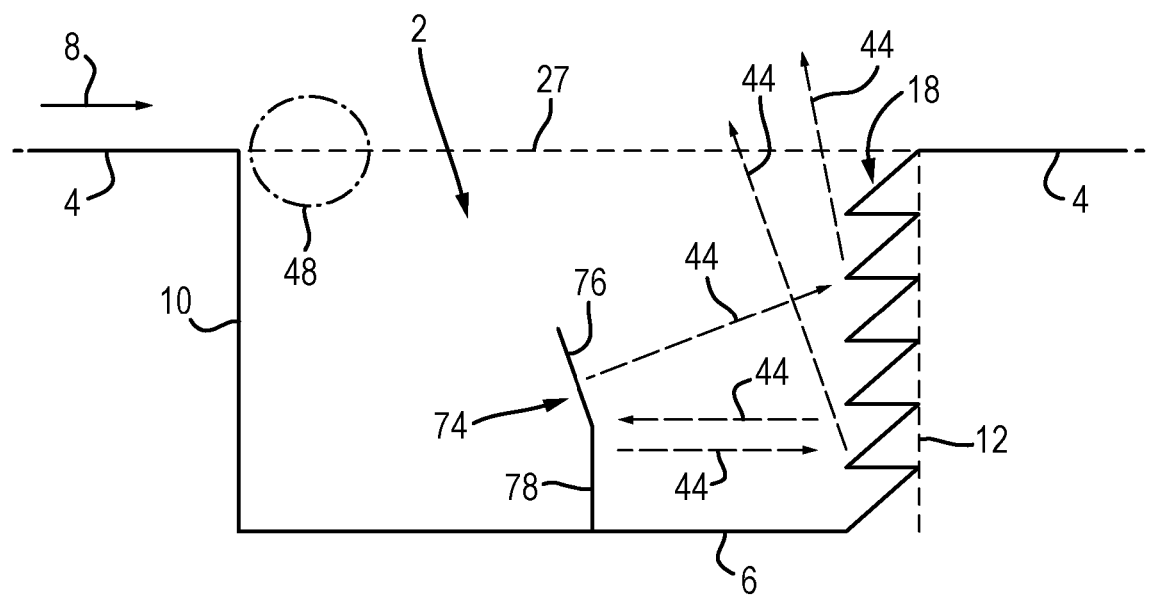
FIG. 6 is a schematic illustration (not to scale) of a side view cross section of a cavity comprising a second acoustic reflective baffle.

In the embodiment shown in FIG. 6, a second baffle 74 comprises a first surface 76 and a second surface 78. The first surface 76 of the second baffle 74 is oblique to the plane of the cavity opening 27. The second surface 78 of the second baffle 74 is substantially perpendicular to the plane of the cavity opening 27. The first and second surfaces 76, 78 of the second baffle 74 are arranged to reflect the forward propagating acoustic wave 44 reflected from the aft wall 12 directly back to the aft wall 12, such that the acoustic energy may be reflected out of the opening of the cavity 2, avoiding the leading edge region 48, by the first acoustically reflective surface 18. In some embodiments, first surface 76 may instead be arranged to reflect the forward propagating acoustic wave 44 directly out of the opening of the cavity 2 avoiding the leading edge region 48.

Figure 7:
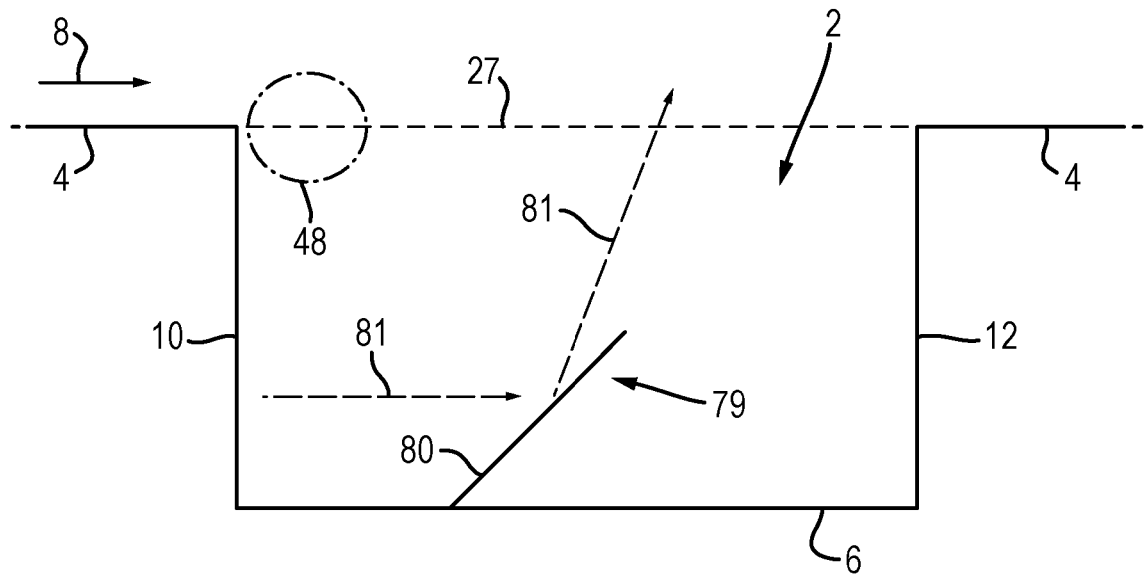
FIG. 7 is a schematic illustration (not to scale) of a side view cross section of a cavity comprising a third acoustic reflective baffle.

In the embodiment shown in FIG. 7, a third baffle 79 comprises a surface 80 arranged to reflect a backwards propagating acoustic wave 81 reflected from the leading wall 10 directly out of the opening of the cavity 2 avoiding the leading edge region 48. The surface 80 of the third baffle 79 is oblique to the plane of the cavity opening 27.

Figure 8:
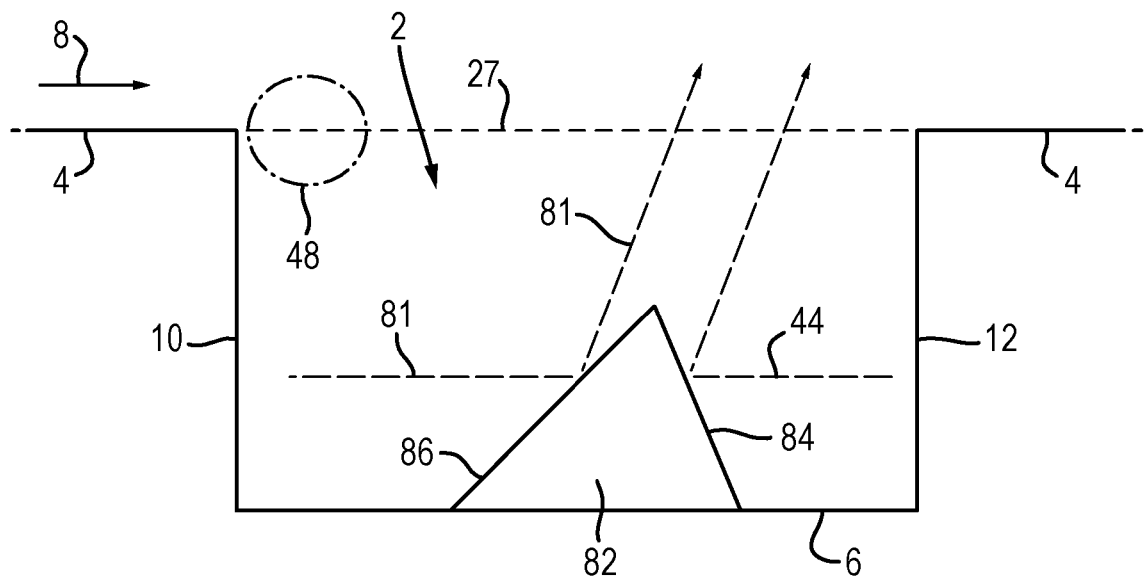
FIG. 8 is a schematic illustration (not to scale) of a side view cross section of a cavity comprising a fourth acoustic reflective baffle.

In the embodiment shown in FIG. 8, a fourth baffle 82 comprises a first surface 84 and a second surface 86. The first surface 84 of the fourth baffle 82 is arranged to reflect the forward propagating acoustic wave 44 reflected from the aft wall 12 directly out of the opening of the cavity 2 avoiding the leading edge region 48. The second surface 86 of the fourth baffle 82 is arranged to reflect a backwards propagating acoustic wave reflected from the leading wall 10 directly out of the opening of the cavity 2 avoiding the leading edge region 48. The first and second surfaces 84, 86 of the fourth baffle 82 are oblique to the plane of the cavity opening 27.

Advantageously, the baffles 72, 74, 79, 82 having surfaces oblique to the plane of the cavity opening 27 and arranged to reflect acoustic noise out of the cavity 2 while avoiding the leading edge region 48 tends to provide that a good proportion of the tonal noise is reflected out of the cavity 2 and is not available to propagate to the leading edge region 48.

In the above embodiments, the acoustically reflective surfaces 73, 76, 78, 80, 84, 86 of the baffles 72, 74, 79, 82 are flat, planar surfaces. However, in other embodiments, some or all of one or more of the baffle surfaces comprises a curved and/or multi-facetted surface. The angles of orientation of the acoustically reflective surfaces may be determined dependent on, for example, the length and depth of the cavity.

Preferably, baffles, such as those depicted in FIGS. 5 to 8, are placed across as large a portion of the cavity width as possible, whilst leaving sufficient clearance for deployment of stores. Also, preferably baffles are placed across as large a portion of the cavity depth as possible, whilst leaving sufficient clearance for deployment of stores.

In the above embodiments, the cavity is rectangular and comprises a planar base, the cavity further comprises, defined relative to an actual or intended flow direction, a leading wall, an aft wall, and two side walls, and these walls are all perpendicular to the planar base. However, these specific cavity details are not essential, and in other embodiments any other cavity shape may be present. For example, there need not be only four walls, the walls need not be straight or perpendicular, the cavity may be defined by one or more walls forming a curved or partially curved perimeter to the cavity, the perimeter may be irregularly shaped, one or more walls may be sloping, the base and or one or more walls may be undulating or sloped, and so on.

Also, it will be appreciated that in embodiments with cavity shapes as described above, including irregularly shaped cavities, the skilled person will modify such directions described above as parallel, transverse, perpendicular, and the like, which are suitable for regularly shaped cavities, to provide other directions that achieve corresponding functionalities, at least to some extent, as those described above as parallel, transverse, perpendicular, and the like. Also, even when the cavity is regularly shaped, in yet further embodiments, directions that contain a resolved part of the described parallel, transverse, perpendicular, and the like direction may be implemented instead of completely parallel, transverse, perpendicular, and the like directions.

As mentioned earlier above, the present inventor has realised it is advantageous in itself to provide features of an acoustic tone control system inside the cavity rather than outside, since, for example, as the inventor has realised, in the case of a closable cavity this will allow the features to be easily removed from the e.g. aircraft's airflow when the cavity is closed. Preferably, the acoustically reflective structures are fixed in the cavity in a manner in which they are fully enclosed in the cavity when the cavity is closed. This tends to be particularly advantageous in applications where the cavity will be closed for relatively long periods, and/or frequently, for example in the undercarriage bay of an aircraft.

The above described surface in which the cavity is recessed may be a surface of a vehicle. The vehicle may be an aircraft, or a missile, or any other type of vehicle, for example a car or a lorry, or a sea vessel, including for example a submarine.

What is claimed is:

1. A cavity system, comprising:
   a cavity comprising a cavity opening; and
   an acoustically reflective structure located within a perimeter defined by sidewalls of the cavity,
   wherein the acoustically reflective structure has a sawtooth shaped cross-section in a plane perpendicular to a transverse direction across a width of the cavity, the acoustically reflective structure comprising one or more acoustically reflective surfaces, each acoustically reflective surface being oblique to a plane of the cavity opening,
   wherein the one or more acoustically reflective surfaces are arranged to reflect an incident acoustic wave out of the cavity opening while avoiding reflection of the incident acoustic wave into a region at or proximate to a leading edge of the cavity, the leading edge being relative to an actual or intended flow direction of a fluid over the cavity,
   wherein the region at or proximate to a leading edge of the cavity extends from the leading edge towards a trailing edge of the cavity by a distance of 0.2 multiplied by a distance between the leading edge and the trailing edge of the cavity, the trailing edge being relative to the actual or intended flow direction of a fluid over the cavity.

2. The cavity system according to claim 1, wherein the acoustically reflective structure comprises a structure mounted to or formed from a trailing edge wall of the cavity, such that one or more of the acoustically reflective surfaces are located at or mounted to the trailing edge wall of the cavity, the trailing edge wall being relative to the actual or intended flow direction of a fluid over the cavity.

3. The cavity system according to claim 2, wherein the one or more acoustically reflective surfaces located at or mounted to the trailing edge wall of the cavity are inclined with respect to a longitudinal dimension of the cavity between the leading and trailing edges of the cavity.

4. The cavity system according to claim 1, wherein the acoustically reflective structure comprises a structure mounted to or formed from a leading edge wall of the cavity, such that one or more of the acoustically reflective surfaces are located at or mounted to the leading edge wall of the cavity, the leading edge wall being relative to the actual or intended flow direction of a fluid over the cavity.

5. The cavity system according to claim 4, wherein the one or more acoustically reflective surfaces located at or mounted to the leading edge wall of the cavity are declined with respect to a longitudinal dimension of the cavity between the leading and trailing edges of the cavity.

6. The cavity system according to claim 1, wherein the acoustically reflective structure is integral with one or more walls of the cavity.

7. The cavity system according to claim 1, wherein the acoustically reflective structure is wholly located with the cavity.

8. The cavity system according to claim 1, wherein the one or more acoustically reflective surfaces comprises one or more surfaces selected from the group of surfaces consisting of: flat, planar surfaces; curved surfaces; and multifaceted surfaces.

9. The cavity system according to claim 1, wherein the cavity comprises a baffle, and wherein the acoustically reflective structure comprises the baffle disposed within the cavity between a leading edge wall of the cavity and a trailing edge wall of the cavity, the baffle being arranged across at least part of a width of the cavity, the leading edge wall and the trailing edge wall being relative to the actual or intended flow direction of a fluid over the cavity.

10. The cavity system according to claim 1, wherein the cavity is recessed in a surface.

11. The cavity system according to claim 10, wherein the surface is a surface of an aircraft, and the cavity is an aircraft weapons bay.

12. A method of controlling acoustic tones in a cavity, the cavity comprising:
    a cavity opening, the method comprising:
    locating an acoustically reflective structure within the cavity,
    wherein the acoustically reflective structure has a sawtooth shaped cross-section in a plane perpendicular to a transverse direction across a width of the cavity, the acoustically reflective structure comprising one or more acoustically reflective surfaces,
    wherein the acoustically reflective structure is arranged such that each acoustically reflective surface is oblique to a plane of the cavity opening, wherein the one or more acoustically reflective surfaces are arranged to reflect an incident acoustic wave out of the cavity opening while avoiding reflection of the incident acoustic wave into a region at or proximate to a leading edge of the cavity, the leading edge being relative to an actual or intended flow direction of a fluid over the cavity,
    wherein the region at or proximate to a leading edge of the cavity extends from the leading edge towards a trailing edge of the cavity by a distance of 0.2 multiplied by a distance between the leading edge and the trailing edge of the cavity, the trailing edge being relative to the actual or intended flow direction of a fluid over the cavity.

* * * * *